United States Patent [19]

Madonna

[11] 3,981,166
[45] Sept. 21, 1976

[54] EASILY ATTACHED BICYCLE LOCKING APPARATUS

[76] Inventor: Nicholas W. Madonna, P.O. Box 431, Montebello, Calif. 90460

[22] Filed: June 16, 1975

[21] Appl. No.: 587,203

[52] U.S. Cl. ............................ 70/234; 224/32 R; 248/230
[51] Int. Cl.² ........................................ B62H 5/00
[58] Field of Search ............... 70/227, 233, 234; 40/128; 224/32 R; 248/62, 221 F, 230; 292/318

[56] References Cited
UNITED STATES PATENTS

| | | | |
|---|---|---|---|
| 390,988 | 10/1888 | Rose | 292/318 |
| 582,978 | 5/1897 | Brown | 248/230 |
| 596,998 | 1/1898 | Hawkins et al. | 224/32 R |

FOREIGN PATENTS OR APPLICATIONS

| | | | |
|---|---|---|---|
| 802,885 | 9/1936 | France | 70/234 |
| 2,364 | 1903 | United Kingdom | 70/227 |

Primary Examiner—Paul R. Gilliam
Assistant Examiner—Victor N. Sakran
Attorney, Agent, or Firm—J. Carroll Baisch

[57] ABSTRACT

A bicycle locking apparatus that is permanently, easily and quickly attachable to a bicycle frame. There is a housing having sides which extend upwardly beyond the top thereof and also rearwardly of the rear end of the housing. The side parts that extend upwardly and rearwardly of the housing form channels into which the horizontal frame member and the downwardly and forwardly inclined frame member are respectively received. In the upper channel, a strip of resilient material is secured by any suitable type of adhesive such as an epoxy cement and extending from the rear wall of the housing into the rear channel is a similar material which is secured to the rear wall of the housing by epoxy cement or any other suitable means. There are upwardly opening recesses at the top and rearwardly opening recesses at the rear. Locking strips are secured to the inner sides of the wall parts to define part of the recesses and have outwardly or lanced tongues or ears which extend into the recesses.

11 Claims, 5 Drawing Figures

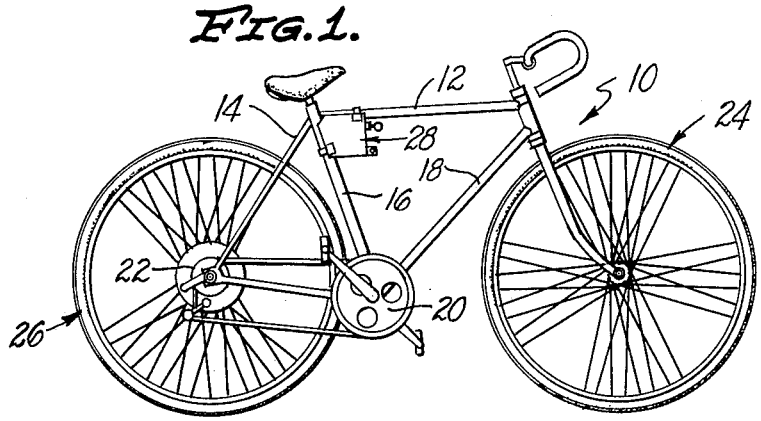
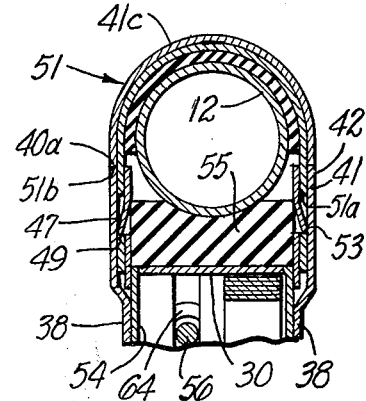
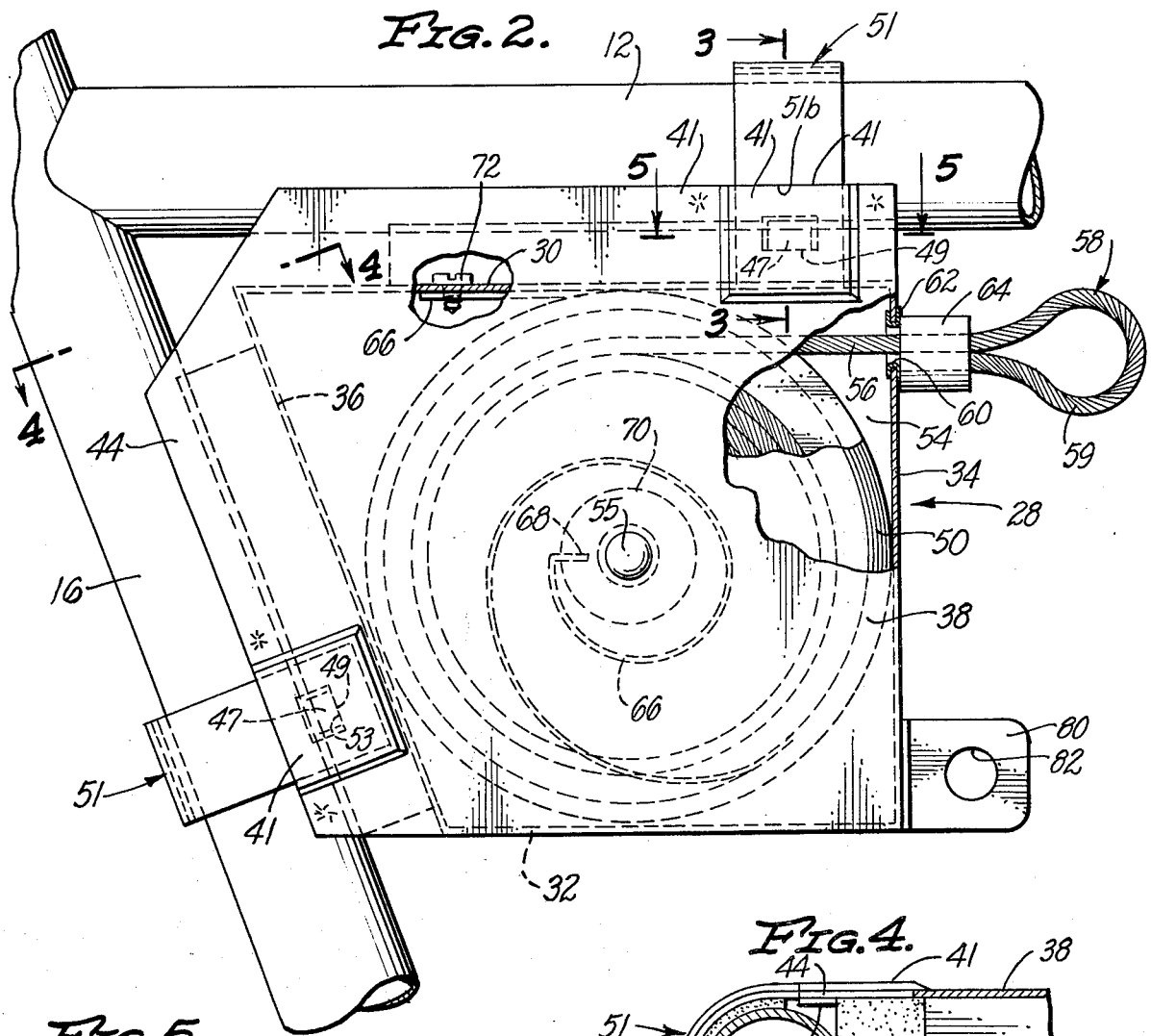
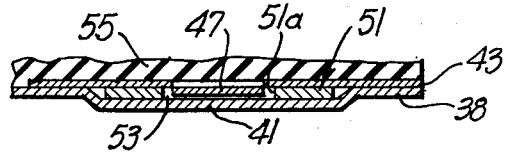
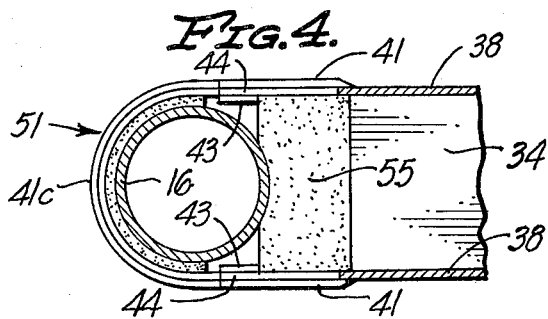

EASILY ATTACHED BICYCLE LOCKING APPARATUS

BACKGROUND OF THE INVENTION

1. Field of the Invention

This invention relates generally to locking apparatus for bicycles to securing bicycles against theft.

2. Description of the Prior Art

There are numerous types of apparatus for securing bicycles against theft but these generally have expensive racks. Other types of apparatus for locking bicycles against theft comprise merely a chain or cable with a pad lock or the like therefor and such chains or cables are wound around a part of the bicycle and some fixed object such as a post or the like. When not in use, the chain or cable is wound about a part of the bicycle frame or carried by the rider.

SUMMARY OF THE INVENTION

This invention comprises a bicycle locking apparatus adapted to be permanently, easily and quickly attachable to a bicycle frame. The apparatus has a housing with top, bottom and ends, and sides which extend upwardly beyond the top of the housing and also rearwardly of the rear end of the housing. The side parts that extend upwardly and rearwardly of the housing from channels into which the horizontal frame member and the downwardly and forwardly inclined frame member are respectively received. In both channels strips of resilient material are secured by any suitable means such as, for example, an adhesive, an epoxy cement being one type that may be used.

These parts are covered by a portion of the bicycle frame when the apparatus is attached to the bicycle. The upwardly extending parts of the side walls have portions pressed outwardly and downwardly from their free edges and a strip of suitable metal is secured to the inner sides of the side wall parts by welding, brazing or other suitable means, said locking strips spaning the pressed out portions and define upwardly opening recesses with the pressed out portions.

The locking strips have outwardly lanced ears which extend into the recesses, these ears having substantially straight lower free ends.

There is a U-shaped fastener for each of the recesses, said fasteners having openings therein with the lower parts thereof substantially straight for engagement by the straight free ends of the ears. To lock the apparatus to a bicycle, it is fitted to the respective horizontal and the downwardly and forwardly inclined frame parts. These frame parts of the bicycle are tightly fitted into the channels and the U-shaped locking strips are inserted and pushed into the respective recesses. As the locking fasteners are forced into the recesses, the ears are sufficiently resilient to yield and when the lower ends of the openings in the locking strips pass beyond the ears, the latter moves into the openings and permanently secures the locking strip in place. The same locking section is provided at the rear of the housing. The fasteners have external strips secured thereto that provide shoulders that overlap the upper edges of pressed out parts of the recesses to close the recesses against entrance of tools of anyone trying to forcibly remove the fasteners.

The strips of resilient material at the top of the housing and at the rear thereof, are compressed by the horizontal frame part of the bicycle and by the downwardly and forwardly inclined frame member. Thus, the device is securely, firmly and permanently secured to the bicycle. Within the housing, there is a spool on which a flexible cable is retractably wound, the spool being urged by a spring within the housing to wind the cable there onto. The cable is of extremely hard material (steel or other material of suitable character, for example). To secure and lock the bicycle, the cable is pulled outwardly of the housing and passed about a post or other firmly anchored object. A padlock of any suitable well-known character is used with the shackle passed through the loop at the outer end of the cable and is placed on an adjacent part of the cable. The padlock is then closed and the bicycle securely attached to a substantially immovable object. When the cable is pulled outwardly of the housing, the spring is wound up and when the padlock is unlocked and the cable freed, the reel is rotated by the spring to wind the cable thereon. The housing is permanently closed by welding the top, bottom, ends and sides together.

OBJECTS AND ADVANTAGES OF THE INVENTION

It is an object of the invention to provide bicycle locking apparatus that is permanently attached to a part of a bicycle such as the frame.

Another object of the invention to provide apparatus of this character that is easily and quickly attached to a bicycle frame without use of tools.

It is still another object of the invention to provide apparatus of this character that is practically impossible to remove from the bicycle frame.

A still further object of the invention is to provide an apparatus of this character that is extremely compact.

A still further object of the invention is to provide apparatus of this character wherein there is a cable that is adapted to be pulled from the housing for securing and locking parts of the bicycle to a fixed anchoring object.

Another object is to provide apparatus of this character wherein the cable is returned to its position within the housing when said cable is released.

Still another object of the invention is to provide apparatus of this character that is extremely easy to use and is highly effective in securing the bicycle against theft.

A further object of the invention is to provide apparatus of this character that is relatively inexpensive to manufacture.

The characteristics and advantages of the invention are further sufficiently referred to in connection with the following detailed description of the accompanying drawings, which represent one embodiment. After considering this example, skilled persons will understand that many variations may be made without departing from the principles disclosed and I contemplate the employment of any structures, arrangements or modes of operation that are properly within the scope of the appended claims.

BRIEF DESCRIPTION OF THE DRAWINGS

Referring to the drawings which are for illustrative purposes only:

FIG. 1 is a side elevational view of a bicycle showing the present invention securely attached to parts of the frame of the bicycle;

FIG. 2 is an enlarged side elevational view of the apparatus attached to a bicycle frame, parts being broken away to show interior parts of the apparatus;

FIG. 3 is a sectional view taken on line 3—3 of FIG. 2;

FIG. 4 is a sectional view taken on line 4—4 of FIG. 2; and

FIG. 5 is a sectional view taken on line 5—5 of FIG. 2.

DESCRIPTION OF THE PREFERRED EMBODIMENT

Referring to FIG. 1, there is shown a bicycle, indicated generally at 10, having a frame of the usual shape and parts, said frame including a substantially horizontal tubular frame member 12, a rearwardly inclined frame member 14, a forwardly and downwardly inclined frame member 16, a rearwardly and downwardly inclined frame member 18 and other usual frame parts. The frame member 16 and 18 are connected at their lower ends to the transverse part, not shown, for the cross part of the peddle mechanism or crank. There is a usual sprocket 20 for the chain to the rear sprocket 22 of the rear wheel and there are also the front and rear wheels 24 and 26.

The present locking apparatus or mechanism comprises a housing, indicated generally at 28, which includes a top 30, bottom 32 and front and rear ends 34 and 36. The housing has side members 38 which with the top, bottom and ends form a housing enclosure 40. The side members 38 have portions that extend upwardly above the top 30 of the housing and also have parts 44 that extend rearwardly of the rear end 36 of the housing. The upwardly extending parts 42 of the sides of the housing provide a horizontal channel 46 for reception of a rear portion of the horizontal frame member 12 and the rearwardly extending portions 44 of the sides of the housing define a rear channel 48 for reception of an adjacent upper portion of said frame member 16. In the upper channel, a cushion of resilient material 55 such as a suitable rubber or plastic foam is secured to the top wall of the housing by any suitable type of adhesive such as an epoxy cement for example. A similar cushion is secured to the rear wall of the housing by an adhesive of any suitable character.

The upwardly extending parts of the side walls or members have shallow, aligned outwardly pressed portions 41 extending from their free edges. A locking strip 43 of steel or other suitable material is secured to the upwardly extending side wall parts by welding, brazing or other suitable means. The locking strips span the respective pressed out portions 41 and define with the walls of said pressed out parts, recesses. The locking strips have outwardly lanced ears 47 which extend into the recesses, said ears having substantially straight generally horizontal lower free ends 49. The rearwardly extending parts of side members or side walls have similar recesses and locking strips.

There is a U-shaped fastener 51 for each of the recesses, said fasteners have openings 51a therein with the lower ends 53 substantially straight for engagement by the straight free ends of the ears. The U-shaped fasteners have downwardly facing shoulders 51b which, when the fasteners are in locking position engage or are close enough to the upper free edges 41a of the pressed out parts 41 to protect against entrance of tool by anyone trying to break or remove the lock. This shoulder is formed by the ends of respective strips 41c which are attached to the outer side of the fasteners by any suitable means such as, for example, spot welding, brazing or by any other suitable means.

Within the housing or housing enclosure 40, there is a spool or reel 50 mounted on a pivot pin 52 having its ends received in openings provided therefor in respective plates 54 spot welded or otherwise suitably secured to the inner sides of the side members or walls 38 so that the ends of the pivot pin are not exposed to the exterior of the housing and therefor cannot be forcibly removed from the housing. It is to be understood that the reel may be otherwise rotatably mounted in the housing by safe means. A cable 56 has its inner end secured to the spool or reel adjacent the pivotal center thereof. Said cable is wound on the spool or reel, a free end portion 58 of said cable extending outwardly through an opening 60 in the front wall 34 of the housing, there being a grommet or other suitable device 62 in said opening. The cable passes through the central opening in the grommet and said grommet provides a smooth friction reducing bearing surface for the cable as it moves inwardly and outwardly of the housing.

The free end portion 58 of the cable is formed in a loop 59 and a free end part of said cable is secured to an adjacent portion thereof by means of a clip 64 press fitted to prevent separation of the free end part of the cable from the adjacent portion thereof.

A spiral spring 66 is disposed at one side of the spool or reel and has an inner end portion 68 turned angularly and fixed in a notch in the hub 70 of said spool or reel. The opposite outer end of the spring 66 is secured to the housing by any suitable means such as, for example, by a screw 72 to the top 30, said spring being under tension so as to cause the spool or reel to rotate and wind the cable 56 thereon when the cable has been pulled outwardly of the housing and released. The cable is of extremely hard material such as steel but is flexible so as to be readily wound on the spool or reel.

To permanently attach the apparatus to a bicycle, it is fitted to the horizontal and to the downwardly and forwardly inclined frame parts of the bicycle. These frame parts are tightly fitted into the channels and the U-shaped locking strips or fasteners are inserted into the respective recesses and pushed thereinto to a point where the lower free edges 49 of the ears 47 engage the lower edges or ends 53 of the openings of the U-shaped fastener. These fasteners straddle the respective frame parts of the bicycle and as they are forced into the recesses, the ears are sufficiently resilient to yield and when the lower ends of the openings in the fastener arms pass beyond the ears, the latter resiliently move into the openings and permanently secure the fasteners in place. The same locking arrangement is provided at the rear of the housing and similar parts are given the same reference number. In order to protect the finish or paint of the frame, the fasteners are provided with a resilient piece of material 78 which is secured in place by any suitable means such as, for example, an epoxy cement of well-known character.

When it is desired to lock the bicycle to an anchoring object, the cable is pulled outwardly and turned about said object. A padlock is then used, the shackle of the padlock being passed through the loop 58 of the cable and about an adjacent portion of the cable.

As the cable is pulled outwardly of the housing, the spring 66 is wound to increase its tension and winding force.

When it is desired to release the bicycle, the padlock is unlocked and removed. The cable will then be easily and quickly wound back on the spool or reel by the spring.

An ear 80 may be provided and welded or otherwise suitably secured to the forward end wall 34 of the housing. Ear 80 is provided with an opening 82. When the padlock is not being used, its shackle can be passed through the opening 82 and the padlock locked, to secure it against theft. Thus, the padlock is conveniently available when it is desired to use same.

The invention and its attendant advantages will be understood from the foregoing description and it will be apparent that various changes may be made in the form, construction and arrangement of the parts without departing from the spirit or scope thereof or sacrificing its material advantages, the arrangement hereinbefore described being merely by way of example and I do not wish to be restricted to the specific form shown or uses mentioned except as defined in the accompanying claims.

I claim:

1. A bicycle locking apparatus, comprising:
   a housing having top, bottom, front and rear end walls and side walls defining a housing enclosure;
   said side walls having upwardly and rearwardly extending portions defining a horizontal channel and a downwardly and forwardly inclined channel respectively for reception of a horizontal bicycle frame part and a forwardly and downwardly inclined bicycle frame part respectively;
   means defining a pair of opposite upwardly opening recesses for the upwardly extending portions of the housing, a pair of opposite, rearwardly opening recesses for the rearwardly extending portions of the housing;
   said recesses being defined in part by respective locking strips secured to the side walls of the housing, said locking strips having outwardly extending ears with their free edges at the bottom thereof, the ears of the locking strips extending into said recesses.

2. The invention defined by claim 1, including means insertable into the recesses to secure the locking apparatus to a bicycle frame;

3. The invention defined by claim 2, wherein said means comprises:
   generally U-shaped fasteners for each pair of recesses, the arms of said fastener having openings therein and said arms being receivable in said recesses, the openings in the arms of said fastener receiving said ears when said fastener is moved to a locking position, the lower free edges of said ears engaging the lower edges of the openings to prevent removal of the fastener.

4. The invention defined by claim 3, wherein the free ends of the ears are substantially straight lower free ends and the inner edges of the openings of the fasteners being substantially straight for operable engagement with the free ends of the ears.

5. The invention defined by claim 4, wherein the arms of the U-shaped fasteners have outwardly extending shoulders closing the outer openings of the recesses.

6. The invention defined by claim 2, wherein the channels have resilient means engagable by frame parts of a bicycle when said apparatus is locked on a bicycle.

7. The invention defined by claim 6, wherein the resilient means comprises a piece of resilient material attached to the top wall of the housing, and rear walls of the housing.

8. The invention defined by claim 3, wherein the U-shaped fastener has resilient material secured thereto and covering the inner curved surface portion thereof.

9. The invention defined by claim 2, wherein there is a reel rotatably mounted within the housing; a flexible cable on said reel, one end of said cable being secured to the central portion of said reel, an outer end portion of said cable extending through an opening provided therefore in the front wall of said housing and formed into a loop; a spring having one end attached to a central portion of the reel and having its other end secured to a wall of the housing, said spring being wound by pulling the cable out of the housing and being adapted to rotate the reel in a direction to wind the cable onto said reel when the cable is released.

10. The invention defined by claim 9, wherein the reel is mounted on axial pivot pin and there are plates within the housing secured to the side walls thereof and having aligned openings therein for reception of end portions of the pivot pin.

11. The invention defined by claim 9, including an ear secured to the outer side of the housing, said ear having an opening therein for a reception of the shackle of a padlock.

* * * * *